June 18, 1940.  F. H. FISHER  2,205,352
ELECTRIC FLOAT
Filed Oct. 25, 1938
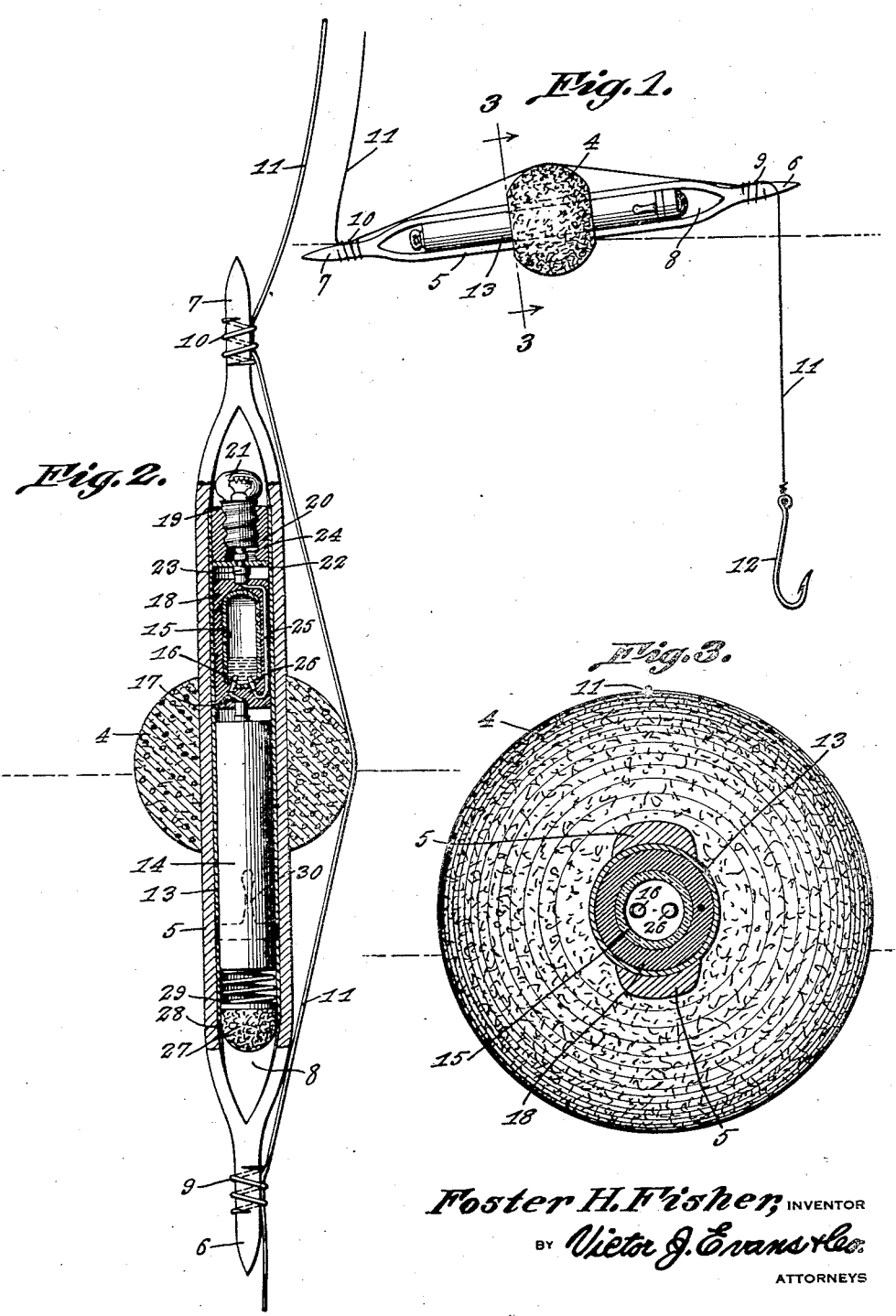
Foster H. Fisher, INVENTOR
BY Victor J. Evans & Co.
ATTORNEYS Patented June 18, 1940

2,205,352

UNITED STATES PATENT OFFICE 2,205,352

ELECTRIC FLOAT

Foster Henry Fisher, Cleveland, Ohio

Application October 25, 1938, Serial No. 236,935

5 Claims. (Cl. 43—49)

My invention relates to improvements in fishing floats and more particularly to a float adapted for night fishing.

One of the principal objects of my invention is to provide a fishing float that is simple in construction, easy of manufacture, and extremely practical in use.

Another object of my invention is to provide a fishing float for night fishing, embodying a signal lamp which will be energized and caused to flash intermittently by the nibbling of a fish upon a line attached to the float.

A further object of my invention is to provide a fishing float for night fishing that will remain illuminated when a fish runs with the line attached to the float.

Yet another object of my invention is to provide a fishing float that will permit the wearing parts to be easily replaced when necessary.

Other objects and advantages of the invention will be apparent during the course of the following description.

In the accompanying drawing, forming a part of this specification and in which like numerals are employed to designate like parts throughout the same;

Figure 1 is a side elevation of a device embodying my invention showing a line and hook attached thereto.

Figure 2 is a side elevation of a device embodying my invention showing parts in section and parts in elevation.

Figure 3 is a transverse section taken on the line 3—3 of Figure 1.

In the drawing, wherein for the purpose of illustration, is shown a preferred embodiment of my invention, the numeral 4 designates a float made from any suitable buoyant material which is slidably carried by the elongated body portion 5. The body portion 5, which is made of any suitable insulating material such as hard rubber, Bakelite, or the like, tapers at its either end to form shank members 6 and 7 and has a slot 8 extending longitudinally along its axis but terminating adjacent the shank members 6 and 7. Light coil springs 9 and 10 carried by the shanks 6 and 7 of the body portion 5 serve as holding means for the line 11 and also permit the hook 12 to be suitably adjusted with respect to the float.

Firmly secured within the slot 8 is a hollow cylinder 13 which functions as a watertight casing for the electric circuit hereinafter described. The cylinder 13 may be made from any suitable conductive material. Disposed within the cylinder 13 and grounded thereby is a finger type battery 14 which contacts the mercury type switch 15 through the terminal 16 and connection 17, said switch being insulated from the cylinder 13 by means of a suitable insulating material 18. Fitted within the end 19 of the cylinder 13 and forming a watertight union therewith is a socket member 20 which is made of a conductive material and carries a flashlight bulb 21 or the like. Interposed between the socket member 20 and the mercury type switch 15 is an insulating washer 22 which holds the contact 23 in axial alignment with the contact 24 of the bulb 21. Connection 25 completes the circuit between the terminal 26 of the mercury type switch 15 and the bulb 21. The cylinder 13 functions as a return conductor between the bulb 21 and the battery 14.

The numeral 27 designates a removable plug member which forms a watertight union with the end 28 of the cylinder 13, and serves as a seat for the coil spring 29 which is interposed between said plug and the finger type battery 14. The spring 29 serves to keep the various units within the cylinder 13 in close frictional engagement with each other thereby insuring a good electrical contact at all times. Clip member 30 is attached exteriorly of the cylinder 13 and permits the float to be conveniently carried in a pocket and used as a flashlight if desired.

The operation of the electric float is as follows:

The float member 4 is adjusted longitudinally along the body member 5 so that the device will be so balanced that it will float with the shank 7 beneath the surface of the water and the shank 6 positioned slightly above the surface of the water as illustrated in Figure 1. This position will normally cause the mercury within the switch to flow away from the terminals 16 and 26, and consequently the circuit will be opened and the bulb 21 extinguished.

When a fish nibbles at the hook or any lure supported by the line 11 the device will bob in the water causing the mercury within the switch 15 to flow alternately against and away from the terminals 16 and 26, thus causing the bulb to flash off and on. Should the fish take the bait and run with it, the float will assume a vertical position as shown in Figure 2 causing the mercury to remain in that end of the switch containing the terminals 16 and 26, closing the circuit, and automatically illuminating the bulb.

The float 4 is adjustable to properly position the device in the water and to allow varying weights of sinkers to be used on the line attached thereto.

It is to be understood that the form of my invention, herewith shown and described, is to be taken as a preferred example of the same and that various changes and modifications in the shape, size and arrangement of parts may be resorted to without departing from the spirit of my invention or the scope of the appended claims.

Having thus described my invention, I claim:

1. A fishing float comprising an elongated body member of nonconductible material provided at its ends with shanks and having a longitudinally extending slot therein, spring means attached to said shanks for holding a line slidably attached thereto, a float means carried by the body member and slidable thereon, a hollow cylinder secured within the longitudinally extending slot of said body member, a battery contained within said cylinder, a mercury type switch and an insulating cover therefor arranged in axial alignment with said battery, a connection between said mercury type switch and said battery, a socket plug hermetically sealing one end of said cylinder, a bulb contained by said socket plug, an insulating washer interposed between said socket plug and said mercury switch, a contact means carried by said washer and maintained in engagement with the said bulb, a connection between said contact means and said mercury switch, a removable plug member fitting into the end of the cylinder opposite that end carrying the said socket plug and making a watertight union therewith, and a spring means interposed between said plug member and said battery and functioning to maintain all members within said cylinder in close frictional engagement with each other.

2. A fishing float comprising an elongated body member of nonconductible material, provided at its ends with shanks and having a longitudinally extending slot therein, spring means attached to said shanks for holding a line slidably attached thereto, a float carried by the body member and slidable thereon to properly position the fishing float in the water, a hollow cylinder of conducting material secured within the longitudinally extending slot of said body member, a source of electrical energy within said cylinder, a socket member positioned in and sealing one end of the cylinder, a removable filler plug positioned in the other end of the cylinder and hermetically sealing the same, a bulb for said socket member, a switch means interposed between said source of electrical energy and said bulb, a fixed contact means interposed between said bulb and said switch contacting said bulb but spaced from said switch, a connection between said contact means and said switch, a connection between said switch and said source of energy, and a liquid conductible material within said switch means, the latter making a connection to said first mentioned connection and said second mentioned connection.

3. In a fishing float, means for illuminating said float when it is inclined substantially from its point of rest comprising in a hollow cylinder carried by said float, a source of energy within said cylinder, a socket positioned in and sealing one end of the cylinder, a bulb contained by said socket, a switch means interposed between said bulb and said source of energy, a fixed contact means maintained in close frictional engagement with said bulb, a connection between said switch and said contact means, a connection between said switch and said source of electrical energy, a liquid conductible material contained by said switch means for making a connection between said first mentioned connection and said second mentioned connection when the float is actuated vertically from its point of rest, and means to render said cylinder watertight.

4. In a fishing float, means for illuminating said float when it is inclined substantially from its point of rest comprising a cylindrical housing carried by the float, a source of energy within said housing, a socket positioned in and sealing one end of said housing, a bulb contained by said socket, a switch means interposed between said bulb and said source of energy, a fixed contact means maintained in close frictional engagement with said bulb but normally spaced from the switch, a connection between said switch and said contact means, a connection between said switch and said source of electrical energy, a liquid conductible material contained by said switch means for making a connection between said first mentioned connection and said second mentioned connection when the float is actuated vertically from its point of rest, spring means for holding all elements in close frictional engagement with each other, and means to render said cylindrical housing watertight.

5. An illuminating device for a float comprising a cylindrical casing carried by a fishing float, a battery within said casing, a mercury type switch and an insulated cover therefore arranged in axial alignment with said battery, a connection between said mercury type switch and said battery, a socket plug hermetically sealing one end of said casing, a bulb contained by said socket plug, an insulating washer interposed between said socket plug and said mercury switch, a contact means carried by said washer and maintained in engagement with the said bulb, a connection between said contact means and said mercury switch, and a removable plug member fitted into the end of the casing opposite that end carrying the said socket plug and effecting a watertight union therewith.

FOSTER HENRY FISHER.